United States Patent [19]
Frank et al.

[11] Patent Number: 5,399,075
[45] Date of Patent: Mar. 21, 1995

[54] PUMP FOR A LIQUID, PARTICULARLY AN ELECTRIC FUEL PUMP FOR AN INTERNAL COMBUSTION ENGINE

[75] Inventors: Kurt Frank, Schorndorf-Haubersbronn; Andreas Herforth, Leonberg-Hoefingen, both of Germany

[73] Assignee: Robert Bosch GmbH, Stuttgart, Germany

[21] Appl. No.: 1,812

[22] Filed: Jan. 8, 1993

[30] Foreign Application Priority Data

Jan. 21, 1992 [DE] Germany ............ 42 01 401.8

[51] Int. Cl.$^6$ ............................................. F04B 17/00
[52] U.S. Cl. ............................ 417/423.1; 417/423.14
[58] Field of Search ............ 417/423.1, 423.14, 423.15, 417/423.3, 424.1, 360; 123/497, 509

[56] References Cited

U.S. PATENT DOCUMENTS

| | | | |
|---|---|---|---|
| 4,651,701 | 3/1987 | Weaver | 123/509 |
| 4,726,746 | 2/1988 | Takada et al. | 417/423.1 |
| 4,776,315 | 10/1988 | Greiner | 123/509 |
| 4,784,587 | 11/1988 | Takei | 417/423.1 |
| 4,945,884 | 8/1990 | Coma | 123/509 |
| 4,971,017 | 11/1990 | Beakley et al. | 123/509 |
| 5,050,567 | 9/1991 | Suzuki | 123/497 |
| 5,149,252 | 9/1992 | Tuckey | 417/423.1 |

FOREIGN PATENT DOCUMENTS

| | | | |
|---|---|---|---|
| 2075598 | 11/1981 | United Kingdom | 123/497 |
| 9111605 | 8/1991 | WIPO | 123/497 |

*Primary Examiner*—Richard A. Bertsch
*Assistant Examiner*—Peter Korytnyk
*Attorney, Agent, or Firm*—Michael J. Striker

[57] ABSTRACT

The pump for a liquid, especially an electric fuel pump, includes a pump portion having feed members drivable to provide a liquid flow; a housing can having a can base and a housing connector pipe extending from the can base and receiving the pump portion; and an electric drive motor having electrical contacts and a drive shaft connected to the feed members to drive the feed members and a motor housing enclosing the electric drive motor through which the drive shaft extends. The feed members are coupled nonrotatably with the drive shaft projecting through the can base. To provide a simpler assembly and reduced manufacturing costs, the drive motor and the enclosing motor housing are installed as a completely preassembled structural unit in the housing can.

25 Claims, 1 Drawing Sheet

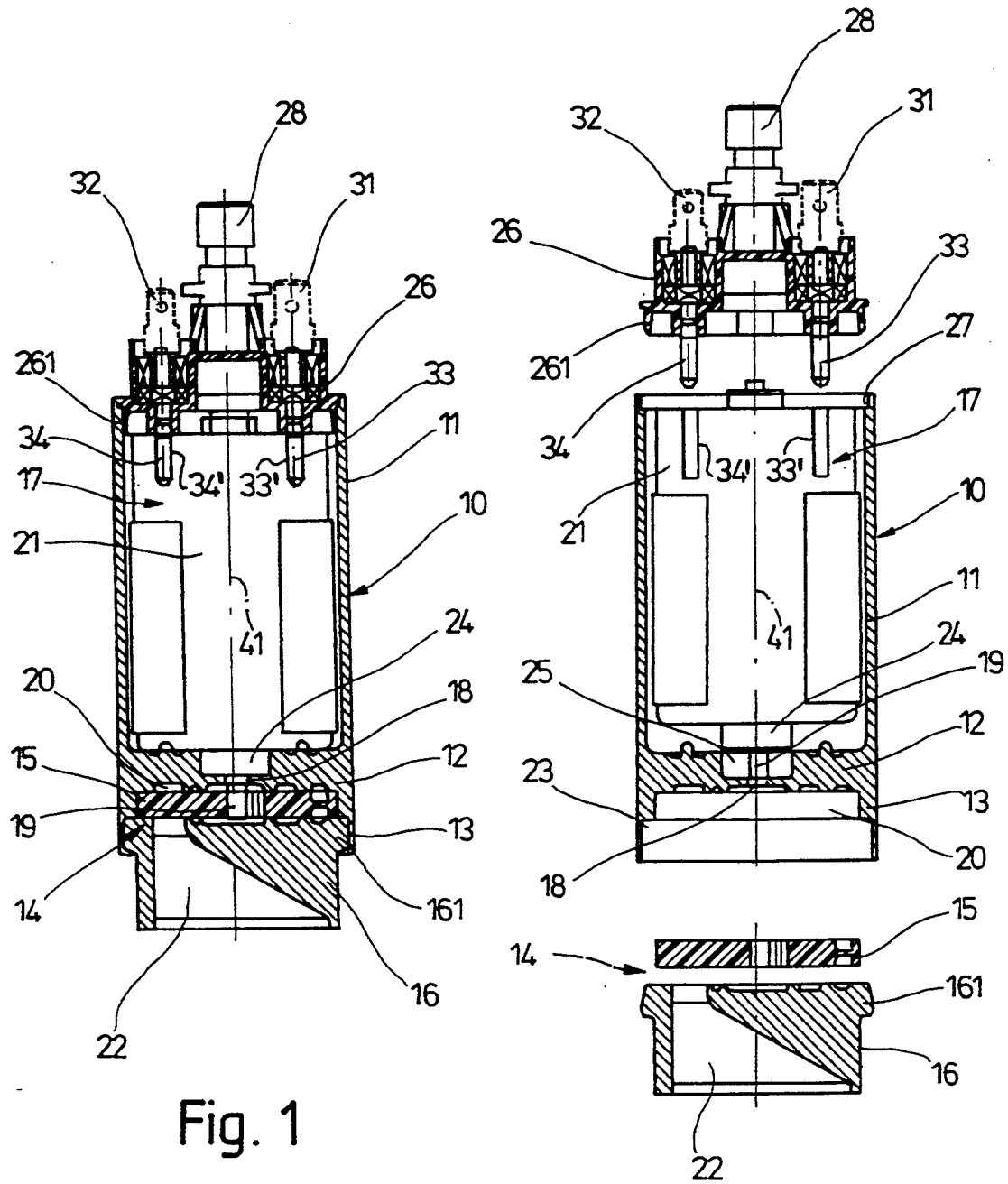

PUMP FOR A LIQUID, PARTICULARLY AN ELECTRIC FUEL PUMP FOR AN INTERNAL COMBUSTION ENGINE

BACKGROUND OF THE INVENTION

The present invention relates to a feed apparatus or pump for feeding a liquid, especially fuel from a fuel tank in a motor vehicle having an internal combustion engine.

A pump for a liquid is known comprising a pump portion having at least one feed member drivable to feed the liquid, an electrical drive motor connected to the at least one feed member to drive the at least one feed member and a housing can receiving the electric drive motor and having a can base, which supports the pump portion in a housing connector pipe projecting from the can base. In this pump the at least one feed member is coupled nonrotatably with a drive shaft of the drive motor projecting through the can base.

In a feed unit of this kind for fuel (described in German Patent Document DE 35 00 139 A1), also called an electric fuel pump, the stator of the drive motor is mounted in a housing can and the rotor is mounted in a guide pipe extending from the housing can base of the housing can. One end of the housing can is closed with a cap, which contains additional bearings for the rotator and a brush holder with carbon brushes. The brushes are connected with connector plugs protruding from the exterior of the cap by electrical connecting lines. The cap supports a hydraulic connector pipe also, which is connected with the housing can interior and is connected to the high pressure side of the feed line. The interior of the housing can is connected by a connecting duct in the can base with a feed chamber provided in the other side of the can base and in which the at least one feed member of the pump is accommodated.

SUMMARY OF THE INVENTION

It is an object of the present invention to provide an improved pump for a liquid, especially an electric fuel pump of an internal combustion engine, which is less expensive and easier to assemble than those of the prior art.

This object, and others which will be made more apparent hereinafter, are attained in a pump for a liquid comprising a pump portion having at least one feed member drivable to provide a liquid flow, an electric drive motor connected to the at least one feed member to drive the at least one feed member and a housing can receiving the electric drive motor and having a can base, which receives the pump portion in a housing connector pipe extending from the can base. In this pump the at least one feed member is coupled nonrotatably with a drive shaft of the drive motor projecting through the can base.

According to the invention, the drive motor is installed as a completely preassembled structural unit enclosed by a motor housing in the housing can.

The feed unit or pump according to the invention has the advantages of economical manufacture with reduced manufacturing costs and a comparatively simple rapid assembly. The drive motor is a marketable item and, since it is made in great numbers, is very valuable. It is very easy to install as a complete unit enclosed in the motor housing in the pump housing. Only the drive shaft of the drive motor protrudes through an opening in the can base. The feed member on the other side of the can base must be nonrotatably connected to the drive shaft. The housing can forms a guide for the complete motor, in which it is placed with scarcely any clearance and thus special motor mounting means are not needed. An additional advantage of the pump according to the invention is that it is possible to test the drive motor and the pump portion separately so that a reduction in the total tolerance variations of the pump can be attained by a suitable pairing of different drive motors and pump portions.

In preferred embodiments of the invention the can base is provided with a throughgoing opening through which the drive shaft of the drive motor projects, the can base is provided with a circular recess coaxial to the throughgoing opening for the drive shaft in the can base and the motor housing is provided with an annular collar axially projecting from the motor housing and surrounding the drive shaft. The annular collar projects and fits in the circular recess, when the motor and motor housing are installed in the housing can.

Another aspect of the present invention is an advantageously plastic closure cap for the housing can having means for holding the drive motor in place in the housing can and means for making electrical connection with the drive motor. This closure cap is secured on an end of the housing can remote from the can base and seals the housing can in a liquid-tight manner. It has a hydraulic outlet pipe and means for electrical connection with the drive motor including contact pins and also electrical connector plugs on an outer side of the closure cap remote from the housing can. The electrical connector plugs being connected electrically with the contact pins project on an inner side of the closure cap into the can housing can so that the contact pins make electrical connection with the electrical contacts of the drive motor.

The electrical contacts of the drive motor can be sockets in which the contact pins fit in to make electrical connection when the closure cap is placed on the housing can. The housing can has a press-fit opening for receiving the closure cap. An edge of the housing can in the vicinity of the press-fit opening is provided with a flanging for holding the closure cap.

The pump portion has a suction cover and the housing connector pipe can have a press-fit receptacle in which the suction cover is received. The suction cover has an annular flange and is held in the press-fit receptacle by the annular flange.

The housing connector pipe can be provided with a feed chamber and the at least one feed member can be located in the feed chamber. The feed chamber is bounded on one side by the can base and on the other side by the suction cover.

The electrical connection and the axial and rotational securing of the complete motor are advantageously provided by the closure cap, which is placed on the end of the housing remote from the can base after insertion of the drive motor. The closure cap carries advantageously the electrical connector plugs and a hydraulic connector pipe to the high pressure side of the pump.

BRIEF DESCRIPTION OF THE DRAWING

The objects, features and advantages of the present invention will now be illustrated in more detail by the following detailed description, reference being made to the accompanying drawing in which:

FIG. 1 is a longitudinal cross-sectional view of an electric fuel pump for an internal combustion engine of a motor vehicle according to the invention; and FIG. 2 is an exploded longitudinal cross-sectional view of the electric fuel pump shown in FIG. 1.

DETAILED DESCRIPTION OF THE PREFERRED EMBODIMENT

The electric fuel pump for an internal combustion engine shown in FIG. 1 assembled and broken into individual components in FIG. 2 is an example of a pump or feed unit for liquid according to the invention. The fuel tank of the vehicle has not been shown. The pump has a can-like housing 10 with a housing can 11 and housing connector part 13 extending from a can base 12. The housing can 11, can base 12 and the housing connector part 13 are in one piece in the preferred embodiment shown in the drawing. The housing 10 receives a pump portion 14 in its housing connector part 13. The pump portion 14 comprises a feed member 15 and a suction cover 16. The housing can 11 holds an electric drive motor 17 for the feed member 15 of the pump portion 14. The housing 10 is a flow molded or flow cast aluminum or steel part or is an extruded plastic part. An opening 18 is provided in the can base 12, through which the drive shaft 19 of the drive motor 17 projects until in an annular feed chamber 20 formed in the housing connector part 13. The feed chamber 20, which is bounded on one end by the can base 12, receives the feed member 15 of the pump portion 14, which is formed here as an impeller. The feed member 15 is nonrotatably attached to the drive shaft 19 of the drive motor 17. On the side furthest from or remote from the can base 12 the feed chamber 20 is closed by the suction cover 16, in which a suction duct 22 opening into the feed chamber 20 widens toward the exterior like a funnel. The feed chamber 20 is connected with the interior of the housing can 11 by connecting passages in the can base 12 which can not be seen in the drawing. The feed member 15 is constructed as an injection molded or extruded plastic part, while the suction cover 16 is a sintered part or an aluminum flow molded or cast part. However the suction cover 16 can also be an extruded plastic part. The suction cover 16 is equipped with an annular flange 161 on its end adjacent the feed chamber 20, which is inserted in a press fit in a press-fit receptacle 23 at the end of the housing connector pipe 13 closest to the base 12 and there is secured against axial and radial displacement. By flanging or beading the annular flange 161 with the edge of the housing connector pipe 13 the suction cover 16 is undetachably connected with the housing connector pipe 13.

The drive motor 17 enclosed in the motor housing 21 is a completely assembled structural unit, which is of a standard size and is inserted into the housing can 11. A circular collar 24 surrounding the drive shaft 19 is provided projecting axially from the motor housing 21 for centering the drive motor 17 in the housing can 11. When the drive motor 17 is in place in the housing can 11, the circular collar 24 fits in a circular recess 25 in the can base which is coaxial with the opening 18 in the can base 12. A liquid-tight closure cap 26 is sealingly connected to an end of the housing can 11 remote from the can base 12 in a liquid-tight manner. The closure cap 26 is an extruded plastic part inserted in a press-fit opening 27 in the housing can 11 and is secured against axial and radial displacement by flanging or beading the housing can edge in the press fit opening 27. An axially projecting annular edge 261 of the closure cover 26 bears on an adjacent end of the motor housing 21 and holds the drive motor 17 axially fixed in the housing can 11.

The closure cap 26 carries on its outer side remote from the housing can 11 a hydraulic outlet pipe 28, which passes through the closure cap 26 and opens into the interior of the housing can 11. Furthermore two electrical connector plugs 31,32 formed as flat plugs project from the exterior of the closure cap 26. These connector plugs 31,32 are connected electrically with contact pins 33,34 extending through the closure cap 26. Connector pins 33,34 are arranged in the closure cap 26 and held so that on placing the closure cap 26 on the housing can 11 the contact pins 33,34 automatically contact the electrical contacts of the drive motor 17. The electrical contacts of the drive motor 17 are provided as plug sockets 33',34' located diametrically opposite each other in relation to the housing axis 41. The contact pins 33,34 engage and fit in the plug sockets 33',34' and thus at the same time fix the drive motor 17 so as to prevent rotation of the motor 17 in the housing can 11.

While the invention has been illustrated and described as embodied in a pump for a liquid, particularly a fuel pump for fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A pump for a liquid comprising:
   a pump portion having at least one feed member drivable to provide a liquid flow;
   a housing can having a can base and a housing connector pipe extending from the can base and holding the pump portion; and
   an electric drive motor having electrical contacts and a drive shaft connected to the at least one feed member to drive the at least one feed member and a motor housing enclosing the electric drive motor through which the drive shaft extends, the drive motor and the enclosing motor housing being installed as a completely preassembled structural unit in the housing can and the at least one feed member being coupled nonrotatably with the drive shaft projecting through the can base.

2. A pump for liquid as defined in claim 1, wherein the can base is provided with a throughgoing opening through which the drive shaft of the drive motor projects, the can base is provided with a circular recess coaxial to the throughgoing opening for the drive shaft in the can base and the motor housing is provided with an annular collar axially projecting from the motor housing and surrounding the drive shaft, said annular collar projecting and fitting in the circular recess of the can base when the motor and motor housing are installed in the housing can.

3. A pump for a liquid as defined in claim 1, further comprising a closure cap for the housing can having means for holding the drive motor in place in the housing can and means for making electrical connection with the drive motor, said closure cap being placed on an end of the housing can remote from the can base.

4. A pump as defined in claim 3, wherein the closure cap seals the housing can in a liquid-tight manner and has a hydraulic outlet pipe and the means for electrical connection with the drive motor includes contact pins and also electrical connector plugs on an outer side of the closure cap remote from the housing can, the electrical connector plugs being connected electrically with the contact pins projecting on an inner side of the closure cap into the housing can so that said contact pins make electrical connection with the electrical contacts of the drive motor.

5. A pump as defined in claim 4, wherein the electrical contacts of the drive motor are sockets in which the contact pins fit in to make electrical connection when the closure cap is placed on the housing can.

6. A pump as defined in claim 3, wherein the housing can has a press-fit opening for receiving the closure cap, said press-fit opening being located remotely from the can base.

7. A pump as defined in claim 6, wherein an edge of the housing can in the vicinity of the press-fit opening is provided with means for holding the closure cap in said press-fit opening.

8. A pump as defined in claim 3, wherein the closure cap is made from a plastic material.

9. A pump as defined in claim 1, wherein the pump portion has a suction cover and the housing connector pipe has a press-fit receptacle in which the suction cover is received.

10. A pump as defined in claim 9, wherein the suction cover has an annular flange and is held in the press-fit receptacle of the housing connector pipe by the annular flange.

11. A pump as defined in claim 9, wherein the housing connector pipe is provided with a feed chamber and the at least one feed member is located in the feed chamber, said feed chamber being bounded on one side by the can base and on the other side by the suction cover.

12. A pump as defined in claim 11, wherein the feed chamber is made from an extruded plastic material.

13. A pump as defined in claim 12, wherein the suction cover is one of an extruded plastic part, a sintered part, an aluminum-flow-molded part and an aluminum-cast part.

14. A pump as defined in claim 1, wherein the housing can, the can base and the housing connector pipe are each portions of a one-piece housing and the one-piece housing is one of an extruded plastic part, a sintered part, an aluminum-flow-molded part and an aluminum-cast part.

15. A pump as defined in claim 1 including means for pumping a fuel for an internal combustion engine.

16. A pump for a liquid comprising:
 a pump portion having at least one feed member drivable to provide a liquid flow;
 a housing including a housing can provided with a can base and a housing connector pipe extending from the can base on a side opposite from said housing can, said housing connector pipe accommodating the pump portion; and
 a completely preassembled structural unit in the housing can, said completely preassembled structural unit including an electric drive motor provided with electrical contacts and a drive shaft nonrotatably connected to the at least one feed member to drive the at least one feed member and a motor housing enclosing the electric drive motor through which the drive shaft extends.

17. A pump as defined in claim 16, wherein the housing can, the can base and the housing connector part are each portions of a one-piece housing.

18. A pump for liquid as defined in claim 16, wherein the can base is provided with a throughgoing opening through which the drive shaft of the drive motor extends, the can base is provided with a circular recess coaxial to the throughgoing opening for the drive shaft in the can base and the motor housing is provided with an annular collar axially projecting from the motor housing and surrounding the drive shaft, said annular collar projecting and fitting in the circular recess of the can base when the motor and motor housing are installed in the housing can.

19. A pump for a liquid as defined in claim 16, further comprising a closure cap for the housing can having means for holding the drive motor in place in the housing can and means for making electrical connection with the drive motor, said closure cap being placed on an end of the housing can remote from the can base.

20. A pump as defined in claim 19, wherein the closure cap seals the housing can in a liquid-tight manner and has a hydraulic outlet pipe and the means for electrical connection with the drive motor includes contact pins and also electrical connector plugs on an outer side of the closure cap remote from the housing can, the electrical connector plugs being connected electrically with the contact pins projecting on an inner side of the closure cap into the housing can so that said contact pins make electrical connection with the electrical contacts of the drive motor.

21. A pump as defined in claim 20, wherein the electrical contacts of the drive motor are sockets in which the contact pins fit in to make electrical connection when the closure cap is placed on the housing can.

22. A pump as defined in claim 21, wherein the housing can has a press-fit opening for receiving the closure cap, said press-fit opening being located remotely from the can base.

23. A pump as defined in claim 22, wherein an edge of the housing can in the vicinity of the press-fit opening is provided with means for holding the closure cap in said press-fit opening.

24. A pump as defined in claim 16, wherein the pump portion has a suction cover and the housing connector pipe has a press-fit receptacle in which the suction cover is received.

25. A pump as defined in claim 24, wherein the suction cover has an annular flange and is held in the press-fit receptacle of the housing connector pipe via the annular flange.

* * * * *